United States Patent
Robinson

[15] 3,638,811
[45] Feb. 1, 1972

[54] VEHICLE LIFT WITH TRAILER HITCH OR THE LIKE

[72] Inventor: Morris D. Robinson, 1509 W. 132nd St., Gardena, Calif. 90249

[22] Filed: Apr. 6, 1970

[21] Appl. No.: 25,905

[52] U.S. Cl. ...................214/77 P, 214/86 A, 214/130, 280/491 B
[51] Int. Cl. ............................................B60p 1/44
[58] Field of Search ............280/491 R, 491 B, 491 A, 491 E; 214/86 A, 77, 77 P, 130, 505

[56] References Cited

UNITED STATES PATENTS

| | | | |
|---|---|---|---|
| 3,375,946 | 4/1968 | Drake | 214/505 |
| RE22,927 | 10/1947 | Gay et al. | 214/130 |
| 2,589,654 | 3/1952 | Archer | 214/77 P |
| 2,617,628 | 11/1952 | Wagner | 214/86 A X |
| 3,495,726 | 2/1970 | Goldhofer | 214/77 |
| 3,534,874 | 10/1970 | Long | 214/86 A X |
| 3,545,791 | 12/1970 | Lugash | 214/77 X |

*Primary Examiner*—Albert J. Makay
*Assistant Examiner*—Robert J. Spar
*Attorney*—Lynn H. Latta

[57] ABSTRACT

A trailer hitch or other auxiliary member is attached to the rear end of a vehicle (e.g. a cargo truck) in associated relation to a rear end lift, such that the hitch is free to move independently of the lift linkage when the lift is lowered for loading or unloading its deck, whereby the hitch may assume a noninterfering relation both to the ground surface and the lift linkage in such lowered position; whereas the movement of the lift to a stored position will automatically lock the hitch to the vehicle in rigid relation thereto such that it will properly function as a hitch when towing a trailer.

8 Claims, 5 Drawing Figures

PATENTED FEB 1 1972

3,638,811

INVENTOR.
MORRIS D. ROBINSON
BY
Lynn H Latta
-ATTORNEY-

VEHICLE LIFT WITH TRAILER HITCH OR THE LIKE

BACKGROUND OF THE INVENTION

Trailer hitches embodying a ball, pintle, hook or other pivotal coupling element carried by a bracket secured to the rear end of a vehicle chassis to provide a sturdy attachment of the coupling element to the vehicle in a rigid relation thereto which is required for effective trailer-pulling operation, are well known and widely used. The problems of effecting such a rigid attachment to the vehicle where other attachments are not present in such rear end area, are largely solved. However, the presence of a rear end power lift for loading and unloading cargo, has heretofore been an obstacle to the addition of an effective and satisfactory trailer hitch.

Trailer hitches having a rigid, fixed attachment to a vehicle equipped with a cargo lift have not proven satisfactory. Where such a hitch has been designed to project rearwardly from the vehicle to a satisfactory distance for efficient trailer pulling and maneuvering, it has obstructed the operation of the lift mechanism. This problem has been solved in some instances by shortening the dimension of rearward projection of the hitch. But this has created another unsatisfactory condition—the coupling pivot being too close to the rear end of the vehicle, has created cornering interference between vehicle and trailer on even moderately short radius turns.

Other attempts to solve these problems by attaching the hitch to the vehicle so as to provide for manual vertical adjustment of the hitch for storage while using the lift, have likewise proven unsatisfactory because of the additional time and effort involved in the manual manipulation of the hitch.

The increasing awareness of the need for safety devices on vehicles has emphasized the importance of what has become known as an underride device (bumper) for preventing a following vehicle from intruding below the bed of a prece;ing vehicle, and the need for improvement therein. Such devices as are presently available (for fixed attachment to a truck) are not compatible with operation of an associated lift.

SUMMARY OF THE INVENTION

The invention provides a combination of lift and hitch (or other auxiliary device such as an underride device) both attached to the rear end of a truck or other vehicle in a common attachment area, but with independent connections such that they can swing vertically with partial independence of one another so that the hitch can move out of the way of the lift as the latter is lowered to leading—unloading position, and can be arrested by contact with the ground, yet avoiding interference with the lift's descent. The invention provides lost-motion linkage interconnecting the hitch and lift linkage to raise the hitch to operative position in response to elevation of the lift to stored position, together with stop mechanism cooperating with such raising linkage to rigidify the lift in its operative position when the lift reaches the stored position. The pull of the trailer maintains upward pressure of the hitch against the lift.

The general object of the invention is to provide a combination of lift and hitch interconnected for operation in the manner outlined above. Specific further objects are to provide such a lift-hitch combination:

1. Of relatively simple yet sturdy and durable construction such as to withstand the rigorous conditions of operation of truck lift and trailer hitch operations;
2. Avoiding undesirable interference between the hitch and the lift linkage;
3. In which the hitch extends rearwardly to a sufficient extent to avoid cornering interference between truck and trailer during short radius turns;
4. Having ample clearance above the hitch coupler pivot and below the lift linkage to provide for unhindered hitching and unhitching operations;
5. In which the pull of the trailer will have a resultant of upward pressure of the hitch against the lift linkage such as to assist in holding the lift in its stored position, largely relieving the latch mechanism of the holding load and substantially eliminating any looseness in the latching connection that might otherwise exist, with a corresponding reduction in vertical vibration of the lift and consequent wear on its latching parts.

DESCRIPTION

Other objects and advantages of the invention will become apparent in the following specifications and appended drawings, wherein.

Figure 5:
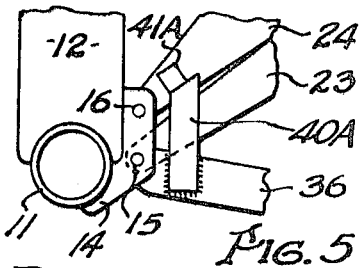
FIG. 5 is a fragmentary side view showing a modified form of stop mechanism.

Referring now to the drawings in detail, I have shown therein, as an example of one form in which the invention can be embodied, a trailer hitch H and lift L both attached, by means of a common mount M, to the rear end of the chassis of a vehicle T which, for example, may be a cargo truck; and operated by an hydraulic unit C.

Mount M may be of the construction shown in Robinson et al. U.S. Pat. No. 3,251,488, issued May 17, 1966, comprising a transverse horizontal mount tube 11 suspended on mount plates 12 secured to and depending from the truck chassis rails 13, and sets of laterally spaced mount ears 14 between which the linkage arms of lift L are pivoted on vertically spaced transverse pivots 15, 16.

Figure 4:
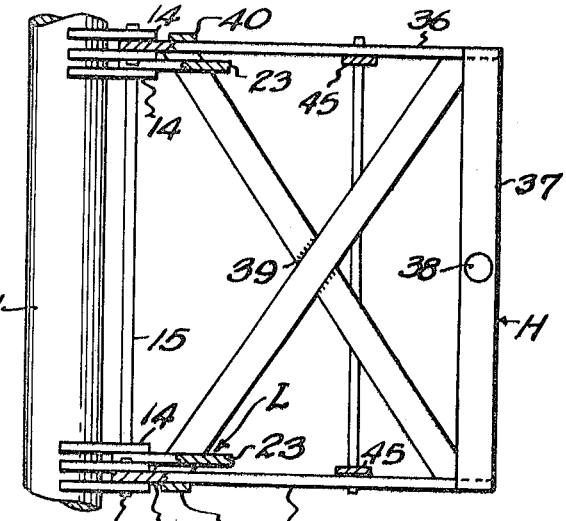
FIG. 4 is a horizontal sectional view taken on line 4—4 of FIG. 1, showing the hitch in plan.
Figure 3:
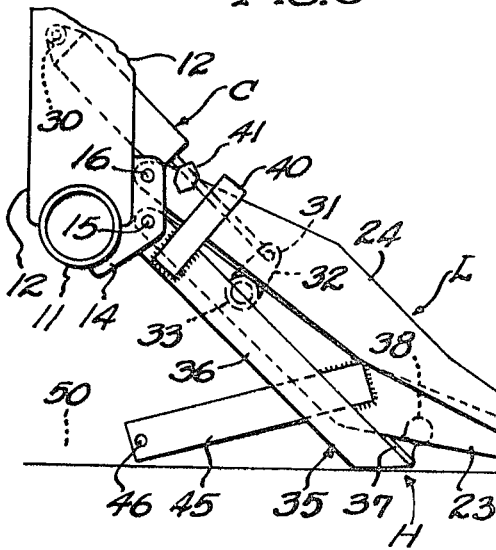
FIG. 3 is a left side elevation of the same, with the left in its lowered, extended position and the hitch in a retracted, noninterfering position with relation to the lift.
Figure 1:
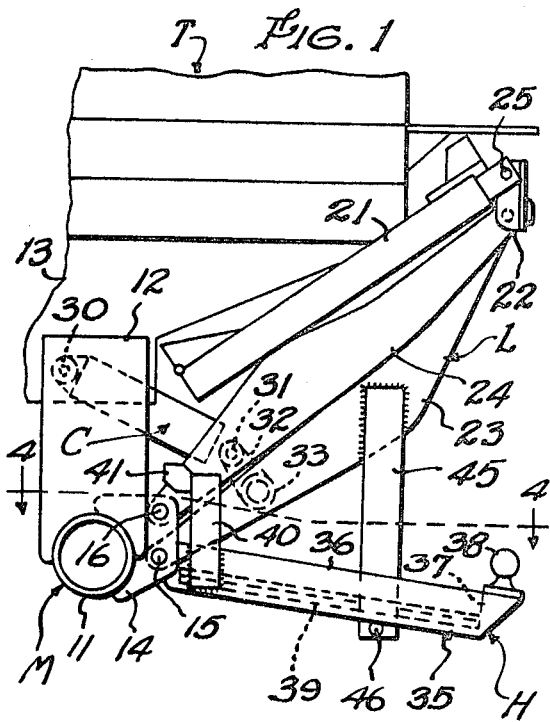
FIG. 1 is a left side elevational view of a combination lift and hitch embodying the invention, the lift being in stored position and the hitch in operative position.

Lift L can be of the type wherein a lift deck (platform) 21 is hinged at 25 on a transverse horizontal axis to a hinge bracket 22 which is supported in a nontilting vertical attitude, for vertical translational swinging movement, by pairs of lift arms 23 and parallel arms 24 which are pivoted to the bracket 22 by pivots which are vertically spaced like mount pivots 15, 16 so as to provide a parallelogram lift linkage including the bracket 22 on which deck 21 is cantilever supported at all levels of elevation and lowering when swung on its hinge pivots 25 from a folded position shown in FIGS. 1 and 4 to an extended position shown in FIG. 3.

Hydraulic cylinder unit C is connected between a pivot 30 anchored to mount M and a pivot 31 carried by a bracket 32 secured to a transverse spacer bar 33 bridging between lift arms 23, in accordance with well-known prior art.

Figure 2:
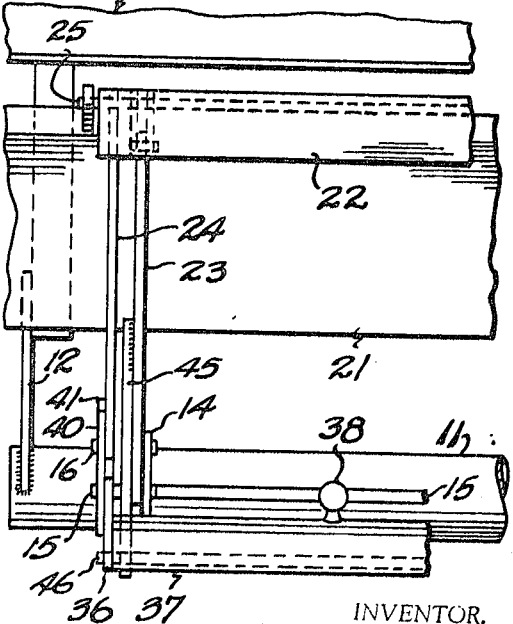
FIG. 2 is a fragmentary rear elevational view of the same.

As shown in FIG. 2, the linkage arms 23, 24 move in separate vertical planes which are laterally spaced to allow overlapping of the arms as viewed in side elevation while avoiding interference between them. In the type of lift disclosed by way of example, the parallel arms 24 are on the outside and the lift arms 23 are embraced between arms 24, although it should be understood that a reverse arrangement could be utilized or they could be in the same plane.

Hitch mechanism H comprises a hitch frame 35 embodying lateral arms 36 pivoted to mount M on pivots which, for the purpose of simplification, can be the linkage-mount pivots 15, although not necessarily so. Arms 36 have swinging free ends bridged by a crossbeam 37 on which is mounted the hitch ball 38 or an equivalent pivotal coupling device. Frame 35 is suitably braced against side sway, as by means of diagonal bracing 39 (FIG. 5). Secured firmly to the outer faces of arms 36 adjacent their mount pivots 15, as by welding, are respective upwardly projecting stop fingers 40. Fingers 40 are in loose embracing relation to lift linkage parallel arms 24 and are positioned to engage against stop blocks 41 secured to the outer faces of arms 24 when the linkage is fully raised and the deck stored as in FIG. 1. Such engagement effectively limits upward movement of the hitch frame 35, locking it against movement above the operative position of the hitch shown in FIG. 1.

Secured to the outer faces of lift arms 23 and thus rigidly associated therewith, are a pair of hitch support arms 45 which extend downwardly in substantially vertical postures when the lift linkage is in the stowed position of FIG. 1. Arms 45 are disposed in vertical planes such as to clear the parallel arms 24 and the hitch frame arms 36 which are disposed in planes outwardly of lift arms 23 (e.g., in the same planes as parallel arms 24). A satisfactory arrangement is one in which the planes of hitcharms 45 are disposed between the planes of lift arms 23 and 24, as shown. It is also possible to locate the arms 45 inwardly of arms 23. Furthermore, hitch arms 35 can be located inwardly of lift arms 23 and inwardly of arms 45. Arms 45, instead of being secured to lateral faces of arms 23, could be integral, coplanar extensions of those arms. It also is possible to have the arms 45 secured to and carried by the parallel arms 24 and in clearing relation to lift arms 23, the essential aspect of the invention being that arms 45 are carried by one arm of a parallelogram structure having an opposed generally parallel arm carrying a locking element which determines an upward limit of movement of the hitch frame. Support arms 45 are bridged at their lower ends by a crossbar 46 which is secured to arms 45, (e.g., by extending through them) and has projecting ends adapted to engage beneath hitch frame arms 36 so as to transmit lift to frame 35 during elevation of the lift linkage toward the stored position of FIG. 1, and to elevate the hitch frame to its operative position shown in FIG. 1. The parts are so arranged that in that position the fingers 40 will contact stop blocks 41 so as to prevent further elevation of hitch frame 35. At the same time the frame 35 will be held against downward movement by the supporting action of crossbar 46. Thus it will be locked against vertical movement in either direction and thus rigidly locked to the truck chassis for effective trailer hitch operation.

When the lift is lowered toward the loading-unloading position of FIG. 3, in fingers 40 will move away from the stop blocks 41, with a spreading action developing gaps between them of sufficient width to free the hitch frame 35 for lost motion between it and the lift arms 23. Such lost motion will occur when the hitch lowered 35 comes to rest against the ground surface G as shown in FIG. 3, and will allow the lift to continue its descent with the support arms 45 sliding downwardly and forwardly between the hitch frame arms 36 until the lift mechanism attains a fully lowered position which may, for example, be limited by contact of deck 21 and/or its supporting parts against ground surface G as in FIG. 3, or by contact of arms 23 against hitch frame crossbeam 37, also indicated in FIG. 3. The arrival of deck 21 at such a fully lowered position will not be hindered by support arms 45, which are so arranged in relation to their carrying arms 23 as to clear the ground surface G, swinging forwardly just above and substantially parallel thereto as indicated by broken arcuate line 50 in FIG. 3.

The spreading action between stop parts 40, 41 is provided for by attaching them to the arms 24, 36 respectively in an arrangement such that the radius of arcuate movement of blocks 41 is much less than that of the end of fingers 40 where they contact blocks 41. Thus during the downward movement of hitch frame 35 prior to its being arrested by contact with ground surface G, the rate of angular movement of fingers 40 being substantially the same as that of blocks 41, the amplitude of circumferential movement of the tips of fingers 40 will exceed that of blocks 41 by a ratio equivalent to the ratio of their respective radii of arcuate movements. Thus it is important that the fingers 40 reach from frame 35 across to the arms 24, for maximum value of this ratio.

As shown in FIG. 5, the stop blocks 41A can be engaged by the tips of stop fingers 40A instead of by the sides of the fingers as in FIGS. 1-3.

It may be noted that in this operative position, hitch frame 35, when elevated to a proper level for coupling a trailer drawbar to its coupling ball 38, projects rearwardly beyond the support bars 45, and is spaced below the linkage of lift L with ample clearance space so that the trailer may be easily coupled and uncoupled without interference with the lift linkage. The invention makes it possible to have the hitch frame extend rearwardly to provide amply for short radius turns without cornering interference between truck and trailer.

The hitch frame 35, in its operative position of FIG. 1, positions the coupling ball 38 at a level below the line of draft from the axis of draft pivots 15 to the point of attachment of the trailer drawbar (not shown) to the trailer, and consequently the pull on the trailer will have a resultant of upward force at coupling ball 38 which will be applied to the lift to assist in maintaining it in stored position.

While the apparatus has been shown and described herein in terms of an assembly of trailer hitch and lift, it is to be understood that the invention also contemplates a similar assembly of lift and any other auxiliary member of comparable proportions, such as a retractable bumper or underride device, which it may be desired to attach to the rear end of a vehicle equipped with a lift, and the appended claims are intended to embrace such other devices as well as hitches.

I claim:

1. In a combined lift and auxiliary member for rear end attachment to a vehicle, in combination:

a lift linkage including arms and means for mounting them to the rear end of a vehicle for upward swinging movements of their free ends;

an auxiliary member including a frame;

means for attaching the forward extremity of said frame to said vehicle near the area of mounting said arms, for vertical swinging of the rear extremity of said frame generally below said arms;

support means carried by said linkage and having means for lost-motion supporting engagement with said frame from below for elevating the frame when said linkage is raised;

said support means comprising support arms depending from said linkage arms in crossed, relatively movable relation to said frame;

said frame being open and including side arms pivoted to said attaching means;

said support arms passing through said frame inwardly of and adjacent said side arms;

said support means including a crossbar extending through the lower ends of said support arms and having end portions projecting beneath said side arms;

and stop elements engageable upon elevation of said frame to an upper limit position and cooperating with said support means to lock said frame against vertical movement so as to establish a rigid connection between said frame and vehicle.

2. In a combined lift and auxiliary member for rear end attachment to a vehicle, in combination:

a lift linkage including arms and means for mounting them to the rear end of a vehicle for upward swinging movements of their free ends;

an auxiliary member including a frame;

means for attaching the forward extremity of said frame to said vehicle near the area of mounting of said arms, for vertical swinging of the rear extremity of said frame generally below said arms;

support means carried by said linkage and having means for lost-motion supporting engagement with said frame from below for elevating the frame when said linkage is raised;

and stop elements engageable upon elevation of said frame to an upper limit position and cooperating with said support means to lock said frame against vertical movement so as to establish a rigid connection between said frame and vehicle;

said lift linkage arms being embodied in a parallelogram arrangement of upper and lower pairs of arms connected to said mounting means by vertically spaced pivots;

said support arms means being carried by one of said lower pairs of linkage arms;

and said stop elements including parts attached to the other pair of said upper linkage arms.

3. The combination defined in claim 2, said stop elements including fingers rigidly anchored to said frame and projecting upwardly for abutting engagement with said parts;

said fingers moving away from said parts during downward movement of said linkage arms and frame to provide lost-motion gaps between said fingers and parts.

4. The combination defined in claim 2;

said stop elements being located near the axis of said vertically spaced pivots;

said support means being disposed between said stop elements and said rear extremity of said frame.

5. The combination defined in claim 1;

said stop elements being located adjacent the axis of attachment of said frame;

said support means being located between said stop elements and said rear extremity of said frame;

whereby upon downward movement of said frame and linkage arms, said stop elements will separate to provide lost-motion gaps between them such that said frame and linkage arms may approach one another during their downward movements.

6. In a combined lift and auxiliary member for rear end attachment to a vehicle, in combination:

a lift linkage including arms and means for mounting them to the rear end of a vehicle for upward swinging movements of their free ends;

an auxiliary member including a frame;

means for attaching the forward extremity of said frame to said vehicle near the area of mounting said arms, for vertical swinging of the rear extremity of said frame generally below said arms;

support means carried by said linkage and having means for lost-motion supporting engagement with said frame from below for elevating the frame when said linkage is raised; and stop elements engageable upon elevation of said frame to an upper limit position and cooperating with said support means to lock said frame against vertical movement so as to establish a rigid connection between said frame and vehicle;

said auxiliary member being a trailer hitch including a coupling pivot element on the rear extremity of said frame.

7. The combination defined in claim 6;

said hitch, when in operative position, supporting the pivot element at a level sufficiently low to be below the line of draft from the vehicle to the trailer, so that the pull on the trailer will develop a resultant of upward pressure of the hitch against the lift.

8. The combination defined in claim 2;

said support means being carried by said lower linkage arms;

and said stop element parts being attached to said upper linkage arms.

* * * * *